Jan. 13, 1942. S. B. GRIMSON 2,270,050
COLOR PHOTOGRAPHY, METHOD, AND APPARATUS
Filed July 17, 1940 2 Sheets-Sheet 1
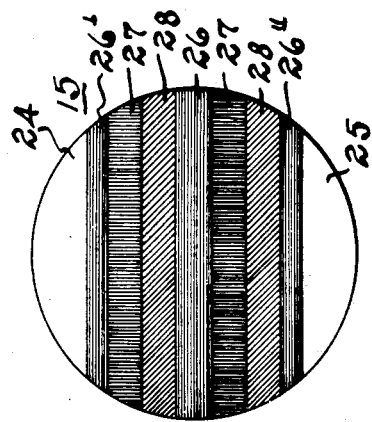
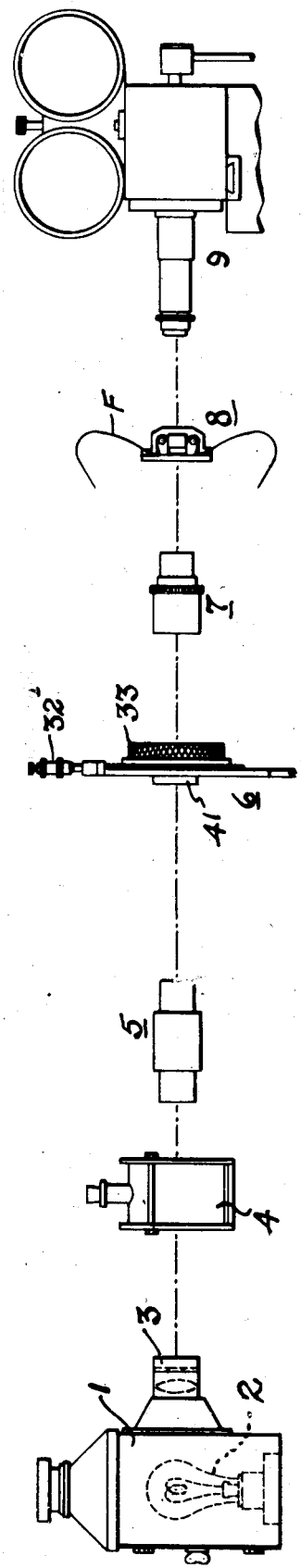
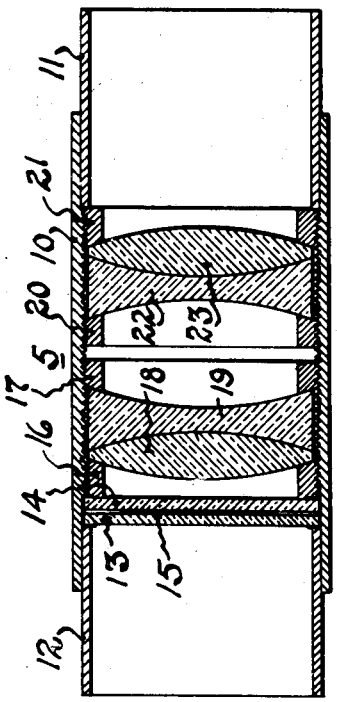
INVENTOR.
Samuel B. Grimson
BY Darby o Darby
Atts.

Jan. 13, 1942.　　　　S. B. GRIMSON　　　　2,270,050
COLOR PHOTOGRAPHY, METHOD, AND APPARATUS
Filed July 17, 1940　　　　2 Sheets-Sheet 2
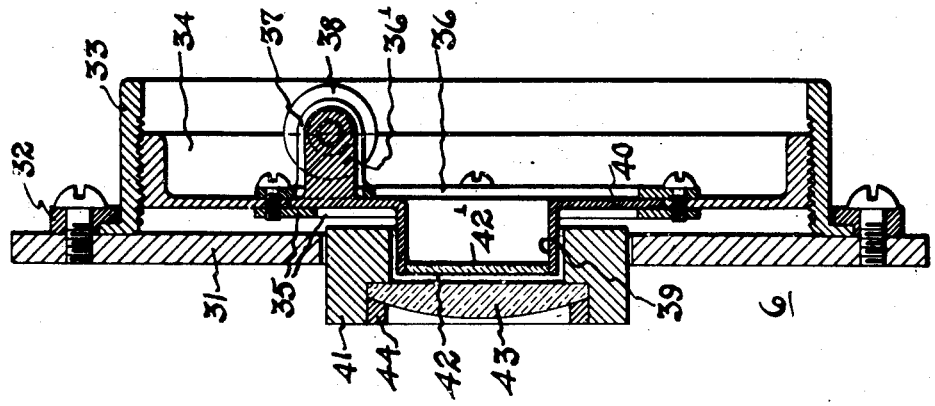
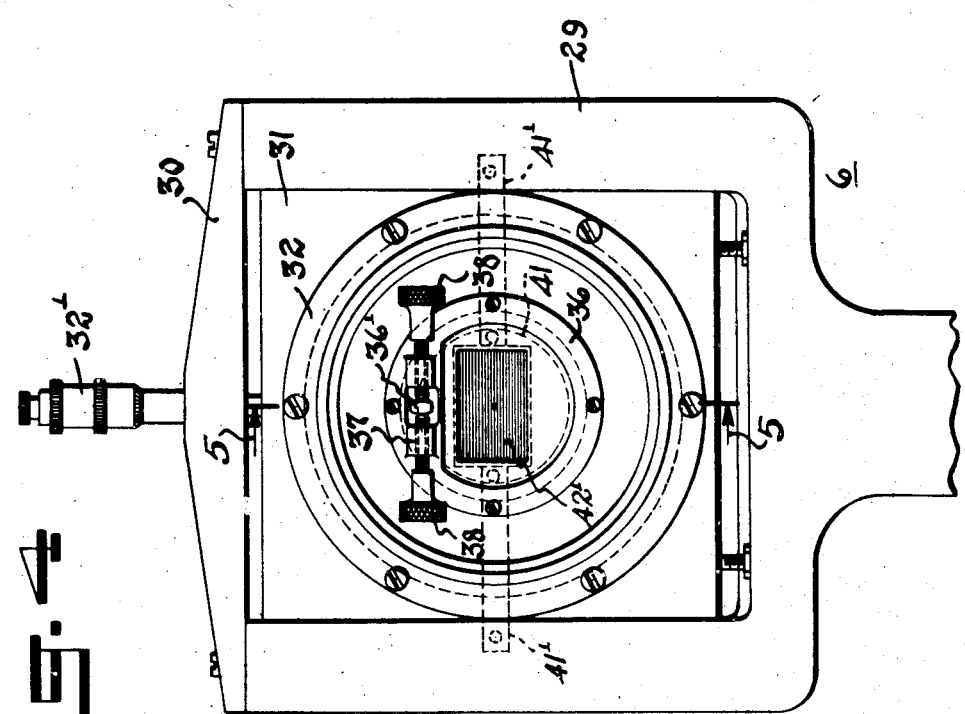
INVENTOR.
Samuel B. Grimson
BY
Darby & Darby
Atts.

Patented Jan. 13, 1942

2,270,050

UNITED STATES PATENT OFFICE 2,270,050

COLOR PHOTOGRAPHY, METHOD, AND APPARATUS

Samuel B. Grimson, New York, N. Y., assignor to Color Research Corporation, New York, N. Y., a corporation of Delaware Application July 17, 1940, Serial No. 345,883

5 Claims. (Cl. 88—16.4)

This invention relates to improvements in methods and apparatus adapted for the production of colored photographic pictures, including moving pictures.

An object of this invention is the provision of methods and apparatus for use in the projection of colored pictures for the purpose of viewing them or for the purpose of re-photographing them on multiple color monopack positive film, that is, multiple emulsion film, or on screen plate film, or for making color separation negatives.

A general object of this invention is the provision of improved and simplified methods and apparatus by means of which colored motion pictures, for viewing or printing, may be produced, in brilliant uncontaminated colors.

A further object of this invention is the provision of methods and apparatus by means of which colored pictures for viewing or printing may be produced from a single panchromatic black and white mosaic negative.

A more specific object of this invention is the provision of methods and apparatus for viewing and/or printing colored pictures, including colored motion pictures, from a black and white photographic panchromatic mosaic negative, as produced by the method disclosed in my United States Patent No. 2,164,062, issued June 27, 1939, for Diffraction method of and apparatus for color photography.

The other and more detailed objects of this invention will be apparent from the following description when taken in connection with the attached drawings.

This invention resides substantially in the combination, arrangement, relative location of parts, steps and series of steps, all in accordance with the within disclosure.

In the accompanying drawings,

Figure 1 is a side elevational view, somewhat diagrammatic in form, illustrating the apparatus of this invention by means of which a panchromatic black and white mosaic photographic negative may be illuminated in colors for purposes of viewing or for printing on a suitable color sensitive film;

Figure 2 is a vertical, central, longitudinal, cross-sectional view through the light projecting lens and color filter of the apparatus of Figure 1;

Figure 3 is a diagrammatic view of multiple series tri-color filter as used with the apparatus of Figure 1;

Figure 4 is a front elevational view of the lens and diffraction grating supporting unit of the apparatus of Figure 1; and Figure 5 is a cross-sectional view, taken on the line 5—5 of Figure 4.

Among the more specific objects of this invention is the provision of an improved apparatus and methods for projecting, for viewing or printing, photographic panchromatic black and white mosaic negatives in accordance with the disclosure in my co-pending application Serial No. 323,888, filed March 14, 1940, for Color photography. Briefly, there is disclosed in that application apparatus for projecting for purposes of viewing or printing, panchromatic black and white photographic mosaic negatives produced by the method of my Patent No. 2,164,062 mentioned above.

In accordance with the aforesaid patent, a scene to be photographed is viewed through a three-color filter in which the color bands are preferably repeated several times, and a lens system for focusing the scene upon a sensitized panchromatic black and white negative through a diffraction grating spaced between them. The result, as disclosed in the aforesaid patent, is panchromatic black and white photographic mosaic negative which when developed will be found to carry an image of the object photographed. If this image is inspected under a micriscope, it will be found to be made up of a mosaic of linear densities corresponding to the exposure made through the banded tri-color filter.

When the image on this film is projected by transmitting through it light from a suitable source, a three-color filter (like the one used in taking) and a filled diffraction grating (like the one used in taking), the picture upon proper adjustment will appear in full color. The picture may be photographed on a suitable color film for the purpose of making colored film prints which are remarkably accurate reproductions of the original scenes in full and brilliant colors or on panchromatic film for making color separation negatives or positives.

In the projection for viewing and printing, as described above, the diffraction grating of necessity is positioned, as disclosed in my above-mentioned co-pending application, extremely close to the negative during illumination. The result of this is that the opaque bars of the diffraction grating are projected onto the film thereby tending slightly to degrade the filter colors imaged through the transparent slits of the grating when illuminated by a lens carrying a three-color filter.

An object of this invention is to provide an improved apparatus and method for illuminating panchromatic negatives of the type under discussion for viewing or printing so as to eliminate such degradation of the filter colors. Briefly, in accordance with this invention, the actual diffraction grating is removed from its close proximity to the negative and is, in effect, replaced by a series of tricolor filter images, formed by and adjacent to the grating, which are projected upon the negative. By thus removing the physical grating from close proximity to the film, another difficulty is eliminated, namely, the effect of dust particles which adhere to the grating. When the grating is extremely close to the negative, the dust which collects on it tends to appear in the projected image and in the case of printing is re-photographed, which, of course, is undesirable. By removing the grating to a more remote point in accordance with this invention, steps may be taken to keep it clean, as for example by means of air jets.

A further important advantage is derived in that by simple lens adjustments full and accurate compensation for film shrinkage is achieved.

Still another advantage of the invention is that the projection grating may be made coarser, that is, with fewer lines to the inch, and, therefore, of better quality and the apparatus adjusted to project filter images optically reduced to the exact size for proper registry with the mosaic of linear densities on the film.

The full importance of the advantages of this method and apparatus will become more apparent after a detailed description of the invention.

Referring to the drawings, there has been indicated, somewhat diagrammatically, a lamp housing at 1, within which is mounted a suitable light source such as the incandescent lamp 2. The light from this source is projected by a condenser lens and aperture plate system 3 through the usual water cell 4 to a lens and filter system 5. The light projected through the filter is focused by this lens of the unit 5 upon a diffraction grating and collimating lens unit 6. The light transmitted through the grating is focused by a lens system 7 upon a film F which passes intermittently through the film feeding unit 8, in the case where the film F is a motion picture film. The film F is a panchromatic black and white mosaic negative, as before mentioned. The light projected through the film F may then be directed into the lens of a motion picture recording camera 9 loaded with a film suitable for the purpose of recording colors, as previously explained. The film F and the film in the camera 9 are, of course, moved in synchronism, as will be apparent to those skilled in the art, for exposing the film of the camera to the pictures projected from the film F. It is, of course, apparent that in place of the camera 9 a suitable screen may be interposed so that the projected pictures may be directly viewed enlarged in full color.

There is shown in more detail in Figure 2 a filter and lens unit 5. It is shown consisting of a tubular housing 10 within which is mounted between the tubular extensions 11 and 12 the filter and lens units and their positioning and fastening means. Interposed between the transparent plates 13 and 14 is the multiple color filter 15. Such filters are known in the industry in various forms and constructional details thereof are therefore known.

As disclosed in my above-mentioned patent, a filter in which the different filter bands are duplicated several times in the same sequence is preferred. In the case of a tri-color filter, for example, comprising red, green and blue bands, they are duplicated several times in the same sequence. A modification of such a filter has been found to give better results with this invention and therefore this filter is diagrammatically illustrated herein in Figure 3, although there is a full disclosure in detail thereof in my above-mentioned co-pending application.

Briefly, as shown in Figure 3, the three color bands are duplicated once, but arranged in a particular way in order to prevent the tinting of the projection field thereof so as to give a uniform distribution of the colors on a screen and thereby produce a field of uniform whiteness. As illustrated, the filter is provided with uncolored or masked top and bottom portions 24 and 25, between which the primary color bands lie. In accordance with the preferred form, one of the color bands, as for example the blue band 26, is placed in the center of the field so that the horizontal diameter of the filter coincides with the longitudinal axis of the band.

Below this band, and contiguous thereto, is the red band 27, below which is the green band 28. Another green band 28 is above the central blue band 26 and contiguous thereto and in turn above it is the other red band 27. This comprises five of the six bands of the duplicated tri-color filter. The sixth band is divided into two equal parts in a longitudinal direction, which parts are disposed as shown at 26' and 26''. Thus it will be seen that the central band 26, whatever its color, is duplicated by a band of the same color of equivalent area which, however, is distributed so as to appear at the top and the bottom of the filter. It has been found that with the colored bands arranged with maximum possible symmetry in this manner there is thereby produced a field of uniform whiteness which is, of course, important in accurately reproducing colored pictures.

Returning now to the lens and filter unit 5, there is shown an ordinary symmetrical lens comprising the convex lens 18, the concave lens 19, the concave lens 22, and the convex lens 23. These lens elements are locked in position between the rings 16 and 17, and 20 and 21, respectively. In actual mechanism the lens unit 5 would be mounted on a suitable adjusting mechanism to effect longitudinal positioning thereof along and transversely of the axis of the apparatus. At this point it may be noted that the lens system 7 is made up of any suitable combination of lenses to provide a projection lens system for projecting and focusing the light and the diffraction grating on the film.

The collimating lens and diffraction unit 6 is shown in greater detail in Figures 4 and 5. It includes a suitable support 29 in the form of a bifurcated standard, the arms of which are bridged by a bar 30 secured thereto. Mounted for vertical sliding movement in the arms of the standard is a plate 31 on which the lens and diffraction grating unit is mounted. Secured to this plate is a flanged ring 32 in which a flanged collar 33 is held for rotation for a purpose to be described later. The collar 33 is internally threaded and supports a flanged disc 34 externally threaded for engagement with the threads on the collar 33. Secured to one face of the flanged disc 34 so as to overlap a central circular opening in the disc is a ring 35 which, together with a somewhat similar ring 36 secured on the other face of the disc, forms a circular track in which a circular flange 40 of the tube 39 is mounted for rotation. The ring 36 is provided with a pair of spaced lugs 37 having aligned threaded passage therein in which are mounted the adjusting screws 38. The flange 40 of the tube 39 is provided with an ear 36' which lies between the adjusting screws 38.

The tube 39 is preferably of rectangular cross-section and has mounted in the end thereof a diffraction grating 42, the ruled surface 42' thereof lying on the side as shown in Figure 5. Briefly, the diffraction grating, which is of well known construction, consists of a piece of optically flat glass, on one face of which is ruled a suitable number of fine lines, as for example 500 lines to the inch. At this point it may be noted, as is clear from my patent and application previously referred to, that the number of lines per inch of the image of the grating 42 is the same as on the diffraction grating used in making the black and white panchromatic mosaic negative. However, because of the nature of this invention the diffraction grating 42 may have the same or less lines to the inch than the grating used in taking because the image thereof as used in this invention can be optically adjusted to the exact size required. It is well to also note that the filter in the unit 5 is of the same construction as the filter employed in preparing the separation negative. As disclosed in the above-mentioned patent, as well as herein, a filled diffraction grating is made by ruling lines of desired width and periodicity on a glass plate, the ruled lines being then filled with an opaque material leaving the unruled interspaces untouched and transparent. Thus for any desired periodicity the ruled (filled) lines may bear any desired relation to the clear spaces. As disclosed in the above mentioned patent it is preferable, but not necessary, in practising this invention to rule the filled lines twice the width of the clear interspaces.

Mounted about the tube 39 is a suitable housing 41 in which the collimating lens 43 is held by means of a ring 44. The housing 41 is constructed, as clearly shown in Figure 5, so as to provide sufficient clearance with respect to the tube 39 to permit of the required relative movement of the grating 42 in the three directions for which its mounting is adapted to have motion. The housing 41 is supported on the standard 29 by the straps 41' to permit of this relative movement of the grating 42. The plate 31 can be adjusted vertically in the standard 29 by means of a micrometer adjusting mechanism 32' mounted on the bar 30. This adjusting mechanism is secured to the plate 31 so that it may be moved up and down in a vertical direction by means of it. The lens and filter unit 5 and the collimating lens 43 are relatively positioned so that their centers are on the same optical axis, in which position they remain for all other adjustments of the apparatus.

The structure of Figures 4 and 5 will be seen to comprise a mounting by means of which the diffraction grating can be rotated in a vertical plane to ensure that the lines ruled thereon and thus the filter images can be adjusted to exact parallelism with those of the film. This is accomplished by manipulating the adjusting screws 38 to cause tube 39 to rotate on a horizontal axis. The micrometer adjusting mechanism 32' serves the function of adjusting the entire unit up and down in a vertical plane so that the images of the color filter transmitted by the clear lines of the grating may vary in register with linear densities on the color separation negative film F during projection and thereby project a colored image either in natural colors or those selected by the operator. At this point it may be noted that by inverting the filter with respect to the position of the taking filter there are obtained different colors than those of the original scene. There are fields of use for this invention when reproducing the scenes in other than original colors, as for example in camouflage detection.

By rotating the ring 33 it will be seen that the grating may be adjusted along a horizontal axis to the proper position. This adjustment, in conjunction with the adjustment of the focusing and projecting lens 7, will result in the images of the color filter produced by the grating being sharply focused on the film F and in proper registry therewith. Furthermore, it will be seen that these adjustments may be made to compensate for film shrinkage, that is, shrinkage of the film F during processing so as to ensure exact registry of the projected image of the grating with the linear densities of the film, notwithstanding any shrinkage that may have occurred.

It will now be apparent that the characteristic of this invention resides in the fact that the diffraction grating 42 in this apparatus is moved from its position of close proximity to the film F, as illustrated in my above-mentioned patent and application, to a more remote position, and that filter images produced thereby are projected onto the film F. By this change the shadows cast by the opaque bands of the grating are substantially eliminated, the difficulties of dust collecting on the grating are removed, and at the same time it becomes relatively easy to compensate for the physical changes in dimension in the negative film F resulting from shrinkage occurring during the processing thereof.

From a more technical viewpoint, the functions of the various elements of the optical train may be described as follows: The optical train includes the light source 2, a condenser and aperture plate 3 (the aperture having the form of a motion picture frame), a banded tri-color filter 15, a projection lens (in the unit 5), a collimating lens 43, a diffraction grating 42, and a color-corrected photographic lens 7. The condensers throw a white circular patch of light on the aperture plate. The projection lens and condensers are so placed relative to the light source that the filament of the light source is focused on the filter. At the same time the projection lens focuses the aperture of the aperture plate on the diffraction grating. The collimating lens focuses an image of the filter on the diaphragm plane of the photographic lens, the result being a patch of white light composed of a plurality of microscopic tricolor bands, on the film. When the various elements of the optical train are properly positioned and focused with respect to one another their functions are as above described in order to get the results of this invention.

It will be apparent to those skilled in the art that the methods and apparatus herein disclosed may be varied without departure from the novel scope of the subject matter of this invention. I do not, therefore, desire to be strictly limited to this disclosure as given for purposes of illustration, but rather to the scope of the claims granted me.

What I claim is:

1. In an apparatus of the type described, the combination including a light source, a filled diffraction grating, a lens and a banded color filter system for focusing white light from the source on the diffraction grating, a film gate having a film aperture, and a lens system for focusing the filter images produced by the grating onto the aperture.

2. In an apparatus of the type described, the combination including a light source, a filled diffraction grating, a lens and tri-color filter system for focusing white light from the source on the diffraction grating, a film gate having a film aperture, a lens system for focusing the tri-color bands transmitted through the grating onto the aperture, and means for exposing a sensitized film to a film in said aperture so illuminated.

3. In an apparatus of the type described, the combination including a light source, a filled diffraction grating, a lens and tri-color filter system interposed between the source and the grating, a collimating lens positioned between said first lens and the diffraction grating, a film gate having a film aperture on the side of the grating from which the light from said source emerges, a lens system for focusing the tri-color bands transmitted through the grating onto said aperture, said collimating lens focusing the filter in the diaphragm of said last lens system, and means for exposing a sensitized film to the light from a film at the film gate.

4. In an apparatus of the type described, the combination including a light source, a filled diffraction grating, a lens and a banded color filter system interposed between the source and the grating, a collimating lens positioned between said first lens and the diffraction grating, a film gate having a film aperture on the side of the grating from which the light from said source emerges, a lens system for focusing the color bands transmitted through the grating onto said aperture, said collimating lens focusing the filter in the diaphragm of said last lens system, means for exposing a sensitized film to the light from a film at the film gate, and means for positioning the diffraction grating along the optical axis of the apparatus and circumferentially and radially with respect thereto.

5. A method of illuminating in colors a black and white photographic negative bearing color separation linear densities comprising, focusing an illuminated aperture on a filled diffraction grating by a lens system containing a banded tri-color filter so that the diffraction grating is illuminated by white light, focusing by a lens system the tri-color images of the color filter formed by the diffraction grating onto the negative in exact registry with the linear densities on the negative, and focusing an image of the filter in the plane of the diaphragm of said last lens system with a collimating lens, whereby the illumination of the negative is uncontaminated by any direct image of the filter.

SAMUEL B. GRIMSON.